UNITED STATES PATENT OFFICE 2,570,551

PRODUCTION OF VINYL AROMATIC COMPOUNDS

David B. Hatcher and Raymond H. Bunnell, Toledo, Ohio, assignors to Libbey-Owens-Ford Glass Company, Toledo, Ohio, a corporation of Ohio No Drawing. Application April 1, 1950, Serial No. 153,502

19 Claims. (Cl. 260—46.5)

The invention relates to a novel method of producing certain complex vinyl aromatic compounds, and to novel polymerizable vinyl aromatic silanes which may be produced economically by such method.

Among the most useful synthetic resins are those produced by addition polymerization of olefinic double bonds. The linkages formed in such addition polymerization consist of carbon chains, which are resistant to hydrolysis and impart stability and water-resistance to the resulting polymers.

The formation of a synthetic resin by addition polymerization is advantageous in that no volatiles are split off during such polymerization. In contrast, the formation of a synthetic resin by condensation is accompanied by the elimination of water or other volatiles. The evolution of volatiles in the formation of a synthetic resin by condensation prevents the synthetic resin from being formed as a casting or other solid body in which the volatiles might be trapped. Thus there are many important applications for which a synthetic resin that is formed by condensation cannot be used.

It has been found that the olefinic double bonds in vinyl or allyl radicals attached to silicon atoms are polymerizable only very slightly, if at all. On the other hand, it has been found that a silane such as p-vinylphenyltrichlorosilane, in which the vinyl radical is attached to the silicon atom through a benzene ring instead of being attached directly to the silicon atom, is capable of rapid polymerization. Although it is thus much more useful for polymerization to a synthetic resin than the other vinyl or allyl silanes heretofore known, a silane in whose molecule a vinyl radical is attached to a silicon atom through a benzene ring is so costly as to be of very limited commercial value because it can be prepared only by an expensive Grignard reaction.

The principal object of the invention is to provide novel vinyl aromatic silanes that are unique in that they not only are rapidly polymerizable like a silane whose molecule contains a vinyl radical connected to a silicon atom through a benzene ring, but also (unlike such a silane) are relatively inexpensive to produce, and further, to provide a novel and economical method by which such novel vinyl aromatic silanes and other valuable vinyl aromatic compounds can be produced. More specific objects and advantages are apparent from the description, which illustrates and discloses but is not intended to limit the scope of the invention.

A novel vinyl aromatic silane embodying the invention has the general formula

wherein $a$ is an alkenyl radical, having from two to three carbon atoms, in which the carbon atom that is connected to the free valence is connected to each of the other carbon atoms; B is a saturated divalent radical which has from two to three carbon atoms, and in which any atom other than carbon and hydrogen consists of a halogen having an atomic weight between 35 and 80; R is a divalent aromatic radical whose atoms consist of hydrogen, from six to eighteen nuclear carbon atoms, and not more than three halogen atoms each having an atomic weight less than 80; and X is a halogen having an atomic weight between 35 and 80.

A halogen having an atomic weight less than 80 is chlorine, bromine or fluorine. A halogen having an atomic weight between 35 and 80 is bromine or chlorine.

An alkenyl radical, having from two to three carbon atoms, in which the carbon atom that is connected to the free valence is connected to each of the other carbon atoms is an alkenyl radical which can be considered to be derived by the removal of a hydrogen atom from each of two adjacent carbon atoms in an ethyl radical or an isopropyl radical (i. e., the alkenyl radical is vinyl or alpha-methyl vinyl).

A saturated divalent radical which has from two to three carbon atoms, and in which any atom other than carbon and hydrogen consists of a halogen having an atomic weight between 35 and 80 is a divalent aliphatic hydrocarbon radical which has saturated

bonds, is unsubstituted, or substituted with a halogen having an atomic weight between 35 and 80, and has from two to three carbon atoms. Such a saturated divalent radical connecting a silicon atom and a nuclear carbon atom can be considered to be derived (1) by the removal of two hydrogen atoms from the same or different carbon atoms in the molecule of a saturated aliphatic hydrocarbon having two or three carbon atoms (i. e., the divalent hydrocarbon radical may be ethylene, methyl methylene, trimethylene, ethyl methylene, 1- or 2-methyl ethylene, or dimethyl methylene), or (2) by the removal of two hydrogen atoms from the same or different carbon atoms in a molecule as described in (1) in which a hydrogen atom attached to a carbon atom has been replaced with a chlorine or bromine atom.

A divalent aromatic radical whose atoms consist of hydrogen, from six to eighteen nuclear carbon atoms, and not more than three halogen atoms each having an atomic weight less than 80 is any radical that can be considered to be derived by the removal of two hydrogen atoms from the molecule of an aromatic substance which consists of from one to three benzene nuclei that contain from six to eighteen carbon atoms, and which has no substituents or has from one to three nuclear substituents each of which is a halogen of atomic weight less than 80 (e. g., benzene, diphenyl, terphenyl, naphthalene, anthracene, phenanthrene, 9-10-dibromoanthracene, 9,10-dichloroanthracene, bromobenzene, chlorobenzene, 1-chloro-4-fluorobenzene, alpha-bromonaphthalene, beta - bromonaphthalene, 2-chloronaphthalene, or 1-bromo-3-chloronaphthalene).

A preferred organosilicon compound of the invention is one having the general formula hereinbefore defined in which R has six carbon atoms, since such compounds are produced more economically than those containing aromatic radicals having a greater number of carbon atoms. It is preferred also that the formula of a compound embodying the invention be one in which each of the radicals $a$ and B has two carbon atoms. It is desirable that X be chloro (for reasons hereinafter explained). It is also desirable that R be phenylene. A preferred compound of the invention is a vinylphenylethyltrichlorosilane, preferably a beta-(vinylphenyl)-ethyltrichlorosilane.

Compositions embodying the invention include the product of the polymerization of a composition comprising an organosilicon compound embodying the invention having the general formula $$a-R-B-SiX_3$$

(as hereinbefore defined). Other compositions of the invention include the product of the hydrolysis of a composition comprising an organosilicon compound of the invention having the above general formula. Also included among the compositions embodying the invention is the product of the hydrolysis and polymerization of a composition comprising such an organosilicon compound.

A preferred polymerization product embodying the invention is one formed by the polymerization of a composition comprising an organosilicon compound having the above general formula in which R has six carbon atoms. It is preferable that the composition to be hydrolyzed and/or polymerized comprise a vinylphenylethyltrichlorosilane.

A composition that is polymerized may contain only an organosilicon compound embodying the invention (or a mixture of compounds of the invention) or it may be a co-polymerizable composition, i. e., it may contain other substances containing olefinic double bonds, including such materials as styrene.

A composition that is hydrolyzed may contain only an organosilicon compound of the invention (or a mixture of compounds of the invention), or it may contain silanes that can be co-hydrolyzed with compounds of the invention (as hereinafter described).

Vinyl aromatic silanes embodying the present invention as hereinbefore described, as well as other vinyl aromatic compounds, are produced by the method of the invention, which comprises generating a vinyl aromatic compound by decomposition of an organosilicon compound having the general formula

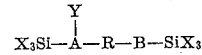

wherein A is a saturated trivalent hydrocarbon radical having from two to three carbon atoms one of which is connected to R and the remainder of which are connected to the carbon atom that is connected to R, the silicon atom and Y being connected to adjacent carbon atoms; B is a saturated divalent radical which has from two to three carbon atoms, and in which any atom other than carbon and hydrogen consists of a halogen having an atomic weight between 35 and 80 (as hereinbefore defined); R is a divalent aromatic radical whose atoms consist of hydrogen, from six to eighteen nuclear carbon atoms, and not more than three halogen atoms each having an atomic weight less than 80 (as hereinbefore defined); X is a halogen having an atomic weight less than 80 (as hereinbefore defined); and Y is a halogen having an atomic weight between 35 and 80 (as hereinbefore defined).

The term "saturated trivalent hydrocarbon radical having from two to three carbon atoms one of which is connected to R and the remainder of which are connected to the carbon atom that is connected to R, the silicon atom and Y being connected to adjacent carbon atoms" is used herein to mean a trivalent aliphatic hydrocarbon radical which can be considered to be derived by the removal of a hydrogen atom from each of two adjacent carbon atoms in an ethyl radical or an isopropyl radical.

It is preferred in the practice of the invention that R and Y be connected to the same carbon atom of A (i. e., that A be a beta-aryl, beta-halo-substituted ethyl or propyl radical). It is preferred that R have six carbon atoms. It is preferred also that each of the radicals A and B have two carbon atoms. It is desirable that X and Y be chloro (for reasons hereinafter explained). It is desirable also that R be a phenylene radical.

The last step in the preparation of a substance, having the general formula hereinbefore defined, which may be decomposed in the method of the invention to produce vinyl aromatic compounds including compounds embodying the invention is the introduction of a chloro or bromo group in place of a hydrogen atom connected to a carbon atom adjacent the carbon atom connected to silicon. (The position of a substituent which is connected to a carbon atom adjacent the carbon atom that is connected to silicon in the molecule of such a substance is referred to herein as the "beta position." For example, in a compound having the following structural formula each of the substituents $x$ and $y$ is in a beta position.)

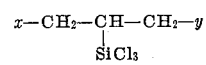

It has been discovered that silylalkyl aromatic compounds chlorinate preferentially in the beta position on the "alkyl" group under the influence of ultraviolet light, particularly when this group has only two carbon atoms. The yield of the beta-chlorinated compound is decreased when the aromatic radical is attached to the "alkyl" group in the alpha-position. Thus, as hereinbefore stated, it is preferred that substances which are decomposed in the method of the invention to produce vinyl aromatic compounds have the general formula hereinbefore defined in which A has only two carbon atoms and in which R is connected to the same (beta) carbon atom as Y.

The chloro or bromo group may be introduced by any desired procedure. For example, a chloro group may be introduced by a liquid phase reaction in which molecular chlorine is brought into contact with the liquid organosilicon compound to be chlorinated. Ultraviolet light is required to conduct the reaction. The reaction is usually conducted at atmospheric pressure and at a slightly elevated temperature, the maximum temperature at atmospheric pressure being limited by the boiling temperature of the organosilicon compound to be chlorinated. It is desirable that the chlorine be bubbled into the organosilicon compound in order to avoid high local chlorine concentrations which are likely to result in burning of the organosilicon compound and a corresponding darkening of the product. The chlorination proceeds at such a rate in ordinary laboratory apparatus that about one mol of an organosilicon compound can be chlorinated per hour when the chlorine is introduced through a single jet. Ordinarily, about one mol of chlorine is used per mol of organosilicon compound to be monochlorinated but the amount that is used can be regulated to control the extent of the chlorination. The organosilicon compound is placed in a suitable reactor and chlorine is admitted (at the bottom of the reactor) as comparatively small bubbles. The chlorine can be dispersed by means of small glass Raschig rings placed at the bottom of the reactor. Ultraviolet light is used to catalyze the chlorination (e. g., from a high pressure mercury vapor lamp equipped with a filter which absorbs all radiation having a wave length shorter than 2800 angstom units, 60 per cent of the radiation having a wave length shorter than 3400 angstrom units and 10 per cent of the radiation having a wave length shorter than 4400 angstrom units; such a lamp is the "Mazda CH-4" 100 watt ultraviolet lamp). The reaction proceeds at a faster rate at elevated temperatures; so it is ordinarily most desirable to conduct it at a temperature of at least about 50 degrees C. It is not desirable to conduct the reaction at a temperature higher than about 150 degrees C., even if the boiling point of the organosilicon compound to be chlorinated is higher than 150 degrees C. It is most desirable to conduct the reaction at a temperature not higher than about 75 degrees C. Chlorination of an organosilicon compound can be conducted at a relatively rapid rate. The chlorine is usually introduced (as comparatively small bubbles) through a jet at a rate not less than about 0.7 mol per hour (if it is desired to chlorinate large quantities of an organosilicon compound, the chlorine can be introduced simultaneously through each of two or more jets at the specified rate). It is most desirable that the rate be at least about 0.9 mol per hour, and not greater than about 1.1 mols per hour.

The reaction can be conducted continuously or as a batch process. When it is run continuously, the liquid organosilicon compound is passed through a tube, and the chlorine is admitted through jets along the length of the tube. The amount of chlorine introduced per hour per jet is such that the ratio of chlorine to organosilicon compound does not give an explosive mixture at any point in the reactor; the same considerations govern the amount of chlorine when the reaction is conducted continuously as when it is conducted batchwise. The jets should be so spaced that the temperature of the reaction mixture does not substantially increase or decrease progressively along the length of the reaction tube (i. e., the jets should be sufficiently far apart so that the temperature of the liquid into which chlorine is introduced from any one jet is not substantially higher than the temperature of the liquid into which chlorine is introduced from any other jet).

The hydrogen chlorde evolved during the chlorination is collected in a water scrubber. The amount of hydrogen chloride absorbed in the water scrubber may be determined at intervals by titration with sodium hydroxide or potassium hydroxide, or the scrub water may be passed into a flask containing the base and an indicator such as methyl orange until the indicator shows the base to be neutralized.

Substances which may have chlorine or bromine introduced in a beta-position on a divalent aliphatic radical connecting a silicon atom to a nuclear carbon atom, by the method hereinbefore described or by any other method, to produce compounds which may be decomposed in the method of the invention include bis- (trichlorosilylethyl) benzenes, bis(trichlorosilylethyl) chlorobenzenes, bis(trichlorosilylethyl) dichlorobenzenes, bis(trichlorosilylisopropyl) dichlorobenzenes, and bis(trichlorosilylisopropyl)-benzenes.

These organosilicon compounds and others which may be chlorinated or brominated in a beta position on a divalent aliphatic radical connecting a silicon atom to a nuclear carbon atom, to produce substances which may be decomposed in the method of the invention, may be prepared by reacting in the presence of an aluminum halide a composition comprising two substances. In such a reacton halogen atoms are split out of aliphatic radicals in two molecules of one substance, and two hydrogen atoms are split out of an aromatic nucleus in one molecule of the other substance so that the reacting molecules are linked into a single molecule by —C—C— bonds.

One of these two substances is an aromatic compound whose molecule consists of from one to three benzene nuclei that contain from 6 to 18 carbon atoms, having no substituents or having from one to three nuclear substituents each of which is a halogen of atomic weight less than 80. Such aromatic compounds include: benzene, diphenyl, terphenyls, naphthalene, anthracene, phenanthrene, 9-10-dibromoanthracene, 9,10-dichloroanthracene, bromobenzene, chlorobenzene, 1-chloro-4-fluorobenzene, alpha-bromonaphthalene, beta-bromonaphthalene, 2-chloronaphthalene, 1-bromo-3-chloronaphthalene, and o-, m- and p-dichlorobenzenes.

The other of these two substances is a haloalkylsilane whose molecule consists of a silicon atom to which are attached four monovalent radicals, three of which are halogens having an atomic weight less than 80, and the fourth of which is a saturated halosubstituted aliphatic radical having from two to three carbon atoms in which the halogen atom has an atomic weight between 35 and 80 and is connected to a carbon atom to which the remaining carbon atoms are connected, (i. e., alpha- or beta-haloethyl, beta-halopropyl, or alpha-haloisopropyl). Such haloalkylsilanes include alpha-chloroethyltrichlorosilane, beta-chloroethyltrichlorosilane, beta-chloropropyltrichlorosilane, and alpha-chloroisopropyltrichlorosilane.

These haloalkylsilanes, and others which may be used to prepare substances which may be decomposed in the method of the present invention, are prepared by chlorinating or brominating such substances as: ethyltrichlorosilane, ethyltrifluorosilane, isopropyltrifluorosilane, ethyldifluorosilane, ethylfluorodichlorosilane, isopropyldifluorochlorosilane, isopropylfluorodichlorosilane, isopropyltrichlorosilane, propyltrichlorosilane and propyltrifluorosilane. It is preferred that the halogen atom introduced into the aliphatic radical and the halogen atoms attached to the silicon atom be chlorine, since chlorine is a cheaper raw material than bromine. The method of chlorinating may be the one using ultraviolet light as hereinbefore described or any other method. The chlorination of an alkyltrihalosilane, such as ethyltrichlorosilane, is a clear cut reaction that proceeds smoothly and rapidly to give a mixture of unchlorinated ethyltrichlorosilane, alpha-chloroethyltrichlorosilane, beta-chloroethyltrichlorosilane, alpha,beta-dichloroethyltrichlorosilane, and some polychlorinated ethyltrichlorosilanes. Beta-chloroethyltrichlorosilane is obtained in the largest amount. When such a mixture of haloalkyltrihalosilanes is reacted with an aromatic compound in the presence of an aluminum halide (by the procedure hereinafter described) the resulting silylalkyl aromatic compound may contain divalent aliphatic radicals which have the same number of carbon atoms but to which the nuclear carbon atoms are connected in different positions. Thus, in the general formula for compounds employed in the method of the invention, the two radicals attached to the aromatic radical are not necessarily identical. For example, a mixture of alpha-chloroethyltrichlorosilane and beta-chloroethyltrichlorosilane may react with benzene to give a 1-(2-trichlorosilylethylphenyl)ethyltrichlorosilane.

The aluminum halide used in the preparation of compounds employed in the method of the invention is one in which each halogen atom has an atomic weight between 35 and 80 (i. e., aluminum chloride or aluminum bromide). The terms "aluminum chloride" and "aluminum bromide" are used herein to mean anhydrous aluminum chloride and anhydrous aluminum bromide. The preferred aluminum halide is aluminum chloride.

The procedure for contacting the aluminum halide with the haloalkylsilane (as hereinbefore defined) and the aromatic compound (as hereinbefore defined) in order to prepare substances which may be chlorinated or brominated to form compounds employed in the method of the present invention comprises adding the aluminum halide in small portions to a mixture of the haloalkylsilane and the aromatic compound. Usually, the first portion of the aluminum halide (¼ to ⅓ of the total amount to be added) is added very carefully at room temperature to the reaction mixture, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions. When the concentration of aluminum halide is maintained at the minimum necessary for reaction, it is possible to isolate the pure product by double distillation. It is usually desirable, however, to remove the catalyst before distillation, for example, by adding to the reaction mixture phosphorus oxychloride, which binds aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (107° C.). After further cooling an amount of a hydrocarbon solvent equal to the volume of the reaction mixture is added to precipitate the $AlCl_3.POCl_3$ complex. Such hydrocarbon solvents include pentane, ligroin and petroleum ethers. The mixture is allowed to stand overnight, and the solid complex is filtered from the solution or the liquid to be distilled is decanted from the mixture, leaving a residue containing the $AlCl_3.POCl_3$ complex. An absorbing agent such as kieselguhr may be added in place of or in addition to the hydrocarbon solvent to absorb $AlCl_3.POCl_3$ complex, and after the reaction mixture cools to room temperature the liquid to be distilled may be filtered from the absorbed complex. There is less chance that aluminum chloride will distill with the product when it is in the form of a complex than when it is in the free state, and when this complex is relatively non-volatile as compared to the organosilane product the product may be distilled under reduced pressure in the presence of the $AlCl_3.POCl_3$ complex.

The aluminum halide should not be added in excess of about 5 mole per cent (based upon the amount of haloalkylsilane present in the reaction mixture). It is most desirable that the amount of the aluminum halide used be not more than 2 mole per cent and not less than about .75 mole per cent.

It is desirable to use an excess of haloalkylsilane over aromatic compound in order to obtain a high yield of the bis(silylalkyl) aromatic compound. The amount of haloalkylsilane should be not less than about 1 mole per mole of aromatic compound, and it is preferred that it be not less than about 1.5 moles per mole of aromatic compound. It is preferred that the molar ratio of haloalkylsilane to aromatic compound be not more than about 2.5 to 1, and most desirable that it be not more than about 2 to 1, although any larger ratio that gives a substantial yield of the desired product may be used. When an excess of aromatic compound over haloalkylsilane is reacted according to the procedure hereinbefore described, for example 3 moles of aromatic compound per mole of haloalkylsilane, a large yield of a mono(silylalkyl) aromatic compound is obtained. Such a mono(silylalkyl) aromatic compound may be reacted in the presence of an aluminum halide (by the procedure hereinbefore described) with an additional amount of a haloalkylsilane to obtain a di-silylalkyl-substituted aromatic compound, in which the "alkyl" radicals are the same or different, which may be chlorinated or brominated to produce a substance for decomposition in the method of the invention.

Organosilicon compounds which may be chlorinated or brominated to produce compounds to be decomposed in the method of the invention may be prepared by the following procedures in which an aromatic hydrocarbon is reacted with a haloalkylsilane using an aluminum halide as a catalyst.

(a) A haloalkylsilane (1 mol of beta-chloroethyltrichlorosilane) and an aromatic hydrocarbon (.6 mol of chlorobenzene) are placed in a 1 liter three-necked flask equipped with a mercury sealed stirrer and a reflux condenser fitted with a calcium chloride tube. The mixture is gently heated and stirred while an aluminum halide (2 mol per cent of aluminum chloride based on the amount of haloalkylsilane) is added in small portions over a period of forty minutes. The mixture is then refluxed for about three more hours. The mixture is cooled to a temperature of about 95 degrees C. and phosphorus oxychloride (3.2 cc.) is added to complex the aluminum chloride. After further cooling, a hydrocarbon solvent (275 cc. of "Sohio S. R. Solvent") is added to precipitate the AlCl₃.POCl₃ complex. The mixture is allowed to stand overnight and is then filtered. The filtrate is placed in a 1 liter Claisen flask and the excess hydrocarbon solvent is distilled at atmospheric pressure. The residue is then distilled under reduced pressure to yield a bis(2 - trichlorosilylethyl)chlorobenzene (49 grams), B. P. 192–195 degrees C. at 1 mm. Hg.

(b) By a procedure similar to that described in the preceding paragraph beta-chloroethyltrichlorosilane is reacted with o-dichlorobenzene to obtain a bis(2 - trichlorosilylethyl)dichloro - benzene.

(c) By a procedure similar to that described in (a) beta-chloropropyltrichlorosilane is reacted with o-dichlorobenzene to obtain a bis(beta-trichlorosilylisopropyl)dichlorobenzene.

(d) By a procedure similar to that described in (a) beta-chloropropyltrichlorosilane is reacted with benzene to obtain a bis(beta-trichlorosilylisopropyl)benzene.

The series of reactions involved in the preparation of an organosilicon compound (e. g., a 2-(1-chloro - 2 - trichlorosilylethylphenyl)ethyltrichlorosilane) which may be decomposed in the method of the invention to produce a vinyl aromatic silane, may be represented by the following equations:

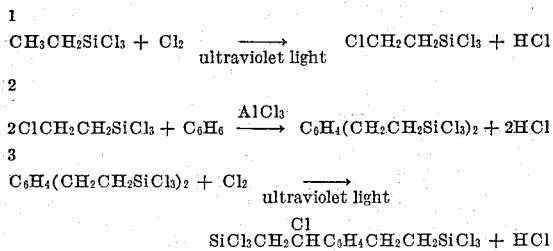

The method of the invention may be carried out (1) by pyrolysis of an organosilicon compound having the general formula

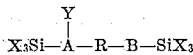

(as hereinbefore defined) or (2) by decomposition of such an organosilicon compound by hydrolysis, preferably in the presence of an aqueous solution of a base. Either procedure involves the splitting-off of the beta-halogen atom and the cleavage of the carbon-silicon bond in the halo-substituted divalent aliphatic radical. Such decomposition leaves a free valence on each of two adjacent carbon atoms, and the product is a vinyl aromatic compound having a double bond between these two carbon atoms in the vinyl radical. When a divalent beta-halo-substituted aliphatic radical connecting a silicon atom with a nuclear carbon atom has three carbon atoms (as hereinbefore described), the product formed by the method of the invention is an alpha-methyl vinyl aromatic compound.

Vinyl aromatic compounds produced by the heretofore known Grignard method are more expensive than similar compounds produced by the present method. Good yields of compounds containing higher aromatic radicals (e. g., silanes containing vinyl naphthyl radicals) cannot be obtained by the method employing a Grignard reaction. Furthermore, the Grignard reaction requires the use of a volatile, inflammable solvent, and, in addition to the fact that large quantities of unwanted by-products are formed, it is difficult to separate the desired product from the magnesium halides. Thus the method of the invention which involves a more practical procedure and which may be used to obtain good yields of compounds containing higher aromatic radicals is extremely advantageous for the production of vinyl aromatic compounds.

Pyrolysis of an organosilicon compound having the general formula hereinbefore defined yields the corresponding vinyl aromatic compound, with the formation of a silicon tetrahalide as a by-product. In addition to the vinyl aromatic silanes of the invention, other vinyl aromatic compounds may be produced by the method embodying the invention that comprises decomposition by pyrolysis. For example, pure divinyl benzene may be prepared by decomposition of a symmetrical organosilicon compound having the general formula hereinbefore defined in which A and B are halo-substituted ethylene radicals and in which the divalent aromatic radical R is phenylene.

The pyrolysis may be accomplished merely by subjecting the organosilicon compound to be pyrolyzed to an elevated temperature (excluding moisture, or any other material that will react with such a compound) simply by dripping the liquid compound into a heated reaction zone. If desired, the compound can be vaporized in suitable equipment and then conducted to a heated reaction zone. When this latter procedure is used, an inert gas may be passed through the equipment to serve as a carrier for the organosilicon compound, but this is not essential. Before pyrolysis is started it is desirable that the equipment be flushed with a heated inert gas to remove any substances with which the organosilicon compound would react. The vinyl aromatic compounds produced by the method of the invention are high boiling materials; therefore, a single water-cooled condenser is sufficient to condense all the product from an ordinary laboratory scale preparation. The hydrogen halide produced by the pyrolysis can be collected in a water scrubber which follows the condenser. The pure product is obtained by fractional distillation (through a packed column) of the liquid collected in the condenser.

Pyrolysis usually occurs at temperatures as low as about 200 degrees C., although complete pyrolysis does not result from the reaction at such a temperature. It is usually preferable to conduct the pyrolysis at temperatures not lower than about 250° C. and most desirable that the reaction be conducted at temperatures not lower than about 300° C. The maximum temperature at which it is practical to conduct the pyrolysis reaction is a temperature above which undesired decomposition occurs, above which increased heat input is not useful because it does not produce larger yields of the desired product, or above which undue polymerization of the product occurs. In most instances it is not practical to conduct the pyrolysis reaction at temperatures higher than about 500° C., and it is preferable that the reaction not be conducted at temperatures higher than about 450° C. Most desirably the reaction is not conducted at temperatures higher than about 400° C.

Conducting the pyrolysis reaction at elevated pressure may tend to reduce the yield. Consequently, the less expensive method of conducting the reaction at approximately atmospheric pressure is preferred.

The pyrolysis can be conducted simply by dripping the liquid organosilicon compound into a heated reaction zone. Pyrolysis occurs readily at the temperatures indicated above, and the resulting compounds are vaporized and can be condensed in a water-cooled condenser attached to the reactor where pyrolysis occurs. When the reaction is conducted in this way the organosilicon compound should be added to the reactor at a rate sufficiently slow so that liquid does not collect in the reactor, as large quantities of the liquid organosilicon compound are likely to pyrolyze and polymerize if subjected to an elevated temperature for an extended period of time. Thus, the rate at which the organosilicon compound is added to the reactor may depend upon the temperature at which the pyrolysis is conducted, a slower rate of addition being used with a lower reaction temperature, and a faster rate when the reactor is maintained at a higher temperature.

The organosilicon compound can also be vaporized in the presence of an inert gas which serves as a carrier for the compound, and the mixture of inert gas and organosilicon compound can be conducted to the reactor. When this method is adopted, the organosilicon compound should be added dropwise to the vaporizer so that there is not an accumulation of large quantities of the liquid compound at the elevated temperatures of the vaporizer. The boiling temperature of the organosilicon compound is higher than the minimum temperature at which pyrolysis occurs so that collection of a considerable quantity of the liquid compound in the vaporizer should be avoided in order to minimize the possibility of pyrolysis and polymerization in the vaporizer. The presence of the inert gas carrier is advantageous because it serves as a diluent and decreases the tendency toward premature addition polymerization. Nitrogen, hydrogen, helium, neon, argon or krypton can be used as the inert gas carrier and diluent, although, in some instances, hydrogen may be undesirable because of a tendency to hydrogenate the vinyl aromatic compound formed.

The pyrolysis reaction proceeds at a relatively rapid rate so that comparatively large amounts of product can be produced by continuous operation of small equipment. There is usually no practical reason for using a reaction time of more than about two minutes. ("Reaction time" is used herein to mean the average time for a quantity of reactant equal to the volume of the reaction zone, calculated at reaction temperature and pressure, to pass into the reactor.) Usually it is preferable to use reaction times not longer than about one minute, and most desirable to use reaction times not longer than about thirty seconds in the practice of the invention. It is ordinarily desirable to use reaction times not shorter than about one second, although in some instances it is possible to use reaction times as low as about ¼ second. It is usually preferable to use reaction times not shorter than about two seconds. Most desirably the reaction of the invention is conducted using reaction times not shorter than about five seconds.

The vinyl aromatic compounds produced by the method embodying the invention that comprises decomposition by hydrolysis, preferably in the presence of an aqueous solution of a base, ordinarily are silicone resins containing vinyl aromatic radicals. It is preferred that the base be an inorganic base. The term "inorganic base" is used herein to mean any base which produces an inorganic cation in aqueous solution. For example, sodium acetate yields sodium ions in aqueous solution. For the sake of economy, the inorganic cation is usually sodium or potassium. Such inorganic bases include: sodium hydroxide, potassium hydroxide and sodium and potassium carbonates, formates, oxalates and tetraborates. Sodium hydroxide and potassium hydroxide are the preferred inorganic bases since it is desirable in the practice of the invention to use an aqueous solution of a strong base. Actually, the decomposition reaction may be carried out using only water. The presence of the base, however, catalyzes the reaction and insures that it will go to completion.

The method of the invention may be carried out in the presence of an aqueous solution of a base by first dissolving an organosilicon compound having the general formula hereinbefore defined in an organic solvent and pouring the resulting solution with stirring over crushed ice. By this step the halo groups connected to silicon are hydrolyzed to liberate a hydrogen halide. The solvent solution layer then may be separated from the water layer and added to an aqueous solution of a base (as hereinbefore described). By using such a procedure to conduct the reaction the amount of base to make the solvent solution alkaline is only a slight excess over the amount needed to neutralize the remaining mol of hydrogen halide formed. If the organosilicon compound is added directly to an aqueous solution of a base, the amount of base required to make the solution alkaline is an excess over the amount needed to neutralize all of the hydrogen halide formed. The solvent layer then may be separated from the aqueous layer and washed with distilled water. Before distillation of the solvent an inhibitor (for example, p-tertiary butyl catechol, p-amino-phenol, hydroquinone, p-benzoquinone, or m-dinitrobenzene) may be added to prevent polymerization of any vinyl aromatic compound that is present.

The molecules of an organosilicon compound having the general formula hereinbefore defined that is used as a starting material for the method of the invention which comprises decomposition by hydrolysis has three hydrolyzable radicals attached to each silicon atom. During the decomposition each hydrolyzable radical may be hydrolyzed to an OH group which can then condense with an OH group attached to another silicon atom to form a siloxane. Thus, the silicone resins containing vinyl aromatic radicals ordinarily obtained by decomposition by hydrolysis of an organosilicon compound having the general formula hereinbefore defined are highly cross-linked siloxanes having a low $r/Si$ ratio ("$r/Si$ ratio" is used herein to mean the total number of non-hydrolyzable radicals attached to silicon atoms in a composition divided by the total number of silicon atoms in the composition). It is usually desirable to decompose by hydrolysis such an organosilicon compound in admixture with other silanes having fewer hydrolyzable radicals attached to each silicon atom in the silane molecules so that the products of the decomposition reaction are actually cohydrolysis products having an $r/Si$ ratio not less than about 1.5. Usually it is preferable that the $r/Si$ ratio be not greater than about 2.5.

Silanes that may be used in admixture with the organosilicon starting materials hereinbefore described in the method of the invention which comprises decomposition by hydrolysis include: ethyltrifluoro-, or chloro- or methoxy- or ethoxy- or propoxy- or n-butoxy- or isopropoxy-, diethyl- diethoxy- or fluoro- or chloro-, diethylchloroethoxy-, ethylchlorodiethoxy-, cyclohexyltrichloro-, cyclohexylmethyldichloro-, trimethylcyclohexyltrichloro-, p - tertiaryamylcyclohexyltrichloro-, methyltrifluoro- or chloro- or bromo-, dimethyldifluoro- or chloro- or bromo-, trimethylfluoro- or chloro- or bromo-, n-propyltrifluoro- or chloro-, di-n-propyldichloro-, tri-n-propylfluoro- or bromo-, isopropyltrifluoro, n-butyltrifluoro- or chloro-, di-n-butyldifluoro-, tri-n-butylfluoro-, isobutyltrichloro-, tri-isobutylbromo-, n-pentyltrifluoro- or chloro-, di-n-pentyldifluoro, tri-n-pentylfluoro-, methylchlorodifluoro-, methylfluorodichloro-, dimethylfluorochloro-, n-propylchlorodifluoro-, n - propylfluorodichloro-, isopropylchlorodifluoro-, isopropylfluorodichloro-, n-butylchlorodifluoro-, n - butylfluorodichloro-, isopentyltrichloro-, tri-isopentylbromo-, methyltriethoxy- or n-butoxy-, dimethyldiethoxy- or n-butoxy-, dimethylchloro-n-butoxy-, trimethylmethoxy- or ethoxy- or n-butoxy-, n-propyltriethoxy-, isopropyltriethoxy-, n-butyltriethoxy-, isobutylchloromethoxyethoxy-, and isopentyltriethoxy- silanes and the like. Ordinarily, it is preferable that the silanes which are used in admixture with the starting materials for the present method comprise not more than about 50 mol per cent of the silane mixture to be dissolved in an organic solvent and subsequently hydrolyzed by the present method.

Solvents which may be used in the method of the invention which comprises decomposition by hydrolysis include benzene, toluene, xylene, dimethyl ether, diethyl ether, dipropyl ether, dibutyl ether, other higher boiling ethers, dioxane, and higher ketones such as 2-hexanone and pinacoline. Usually the solvent is present in an amount at least equal to the volume of the organosilicon compound (or mixture of organosilicon compounds), but any larger volume of solvent that is economically feasible may be used. It is necessary to use only the amount of water required to hydrolyze all the hydrolyzable halogen, but it is preferable to use more than this theoretical amount to prevent gelation of the product. Usually not more than about 40 mols of water per mol of halogen to be hydrolyzed should be used. It is preferable to use at least 20 mols of water and most desirable to use about 30 mols of water per mol of halogen to be hydrolyzed. The amount of base used should be sufficient to give the solution, after the addition of the organosilicon compound, a pH of at least 7. Usually it is not necessary to use a more concentrated solution than a 2 molar solution of the base to insure completion of the reaction, and it is most desirable to use about a 1 molar solution of the base.

Compounds embodying the invention prepared as hereinbefore described are highly useful compounds which are capable of rapid addition polymerization through the olefinic double bonds of the vinyl groups. Polymerization is usually accomplished by the action of heat, although it may proceed even at room temperature. It is usually desirable to add to the vinyl aromatic compound to be polymerized a small amount of a peroxide polymerization catalyst so that the polymerization proceeds rapidly at a relatively low temperature.

It has been found that the polymerization proceeds readily at temperatures as low as about 50° C., although it is usually desirable to conduct the polymerization at temperatures not lower than about 60° C. It is usually not advantageous to polymerize the vinyl aromatic silanes of the invention at temperatures higher than about 90° C., and it is ordinarily preferable to polymerize these vinyl aromatic silanes at temperatures not higher than about 80° C.

The rate of the addition polymerizaiton is faster in the presence of peroxide type polymerization catalysts. Peroxide type polymerization catalysts include benzoyl peroxide, succinyl peroxide, tert-butyl perbenzoate, di-tert-butyl perphthalate, acetyl peroxide, peracetic acid, perbenzoic acid, toluoyl peroxide, p-bromobenzoyl peroxide, anisoyl peroxide, chloroacetyl peroxide, acetyl benzoyl peroxide, diacetyl peroxide, and furoyl peroxide. Certain organic ozonides also increase the rate at which addition polymerization of olefinic double bonds takes place; examples of organic ozonide polymerization catalysts include diisopropyl ozonide and di-isobutylene ozonide.

Although any amount of a catalyst sufficient to cause the polymerization to proceed at a reasonable rate can be used in carrying out the polymerization reaction, the usual "catalytic amounts" are normally employed. For example, it is ordinarily advantageous to use an amount of a polymerization catalyst that is at least about 0.05 per cent of the composition to be polymerized. (The terms "per cent" and "parts," as used herein to refer to quantities of material, mean per cent and parts by weight unless otherwise qualified.) It is usually preferable that the amount of catalyst used be at least about 0.1 per cent of the composition to be polymerized. Ordinarily, it is advisable that the amount of catalyst used be not more than about 5 per cent of the composition to be polymerized, and most desirable that the amount of catalyst be not more than about 3 per cent.

The polymerization can be conducted to any desired extent, as the composition goes through well defined polymerization stages, becoming first a viscous syrup, next a soft, rubbery resin, and finally a hard, brittle resin. In most instances the hard resin stage is reached within about sixteen hours when the polymerization is conducted at a temperature of 70° C., and the soft, rubbery stage is reached within about two hours when the polymerization is conducted at 70° C. The length of time for which the polymerization is conducted depends upon the extent of polymerization desired, upon the temperature at which the polymerization is conducted, and upon the amount and effectiveness of the polymerization catalyst used.

It is sometimes desirable to copolymerize the vinyl aromatic silanes embodying the invention with other materials containing polymerizable olefinic double bonds. These compounds of the invention undergo addition polymerization in much the same way that styrene undergoes addition polymerization, and they copolymerize readily with styrene and with compounds that copolymerize with styrene. Examples of compounds that copolymerize with styrene include methyl methacrylate, acrylonitrile, butadiene, vinylidene chloride, and esters of such acids as maleic, acrylic and itaconic with allyl, methallyl, 1-chloro-2-propyl, 2-chloroethyl, benzyl, tetrahydrofurfuryl, cyclohexyl, phenyl, o-cresyl, m-cresyl, p-cresyl, methyl, ethyl, propyl, isopropyl, n-butyl, isobutyl or secondary butyl alcohol, or a primary or secondary monohydric alcohol having from five to eight carbon atoms.

When the silanes of the invention are copolymerized it is usually desirable that the polymerization be conducted at a temperature somewhat lower than that used when the silanes are polymerized alone, because most of the materials that can be copolymerized with these silanes are lower boiling materials than are the silanes themselves. It is usually desirable to conduct the copolymerization in the presence of one of the specified polymerization catalysts in an amount hereinbefore set forth so that the copolymerization can be conducted at a comparatively low temperature. It is usually not desirable that the copolymerization be conducted at a temperature higher than about 85° C., and it is ordinarily preferable to use a temperature not higher than about 75° C. Although copolymerization proceeds at room temperature (i. e., about 25° C.) it is usually desirable that the copolymerization be conducted at a temperature of at least about 35° C., and ordinarily preferable that it be conducted at a temperature of at least about 45° C.

The copolymerization is allowed to proceed for a time sufficient to accomplish the degree of polymerization desired. This time is usually at least about 12 hours at the comparatively low temperature used for copolymerization and may be as long as about 70 hours, although the material is usually gelled in somewhat less than 70 hours.

It is desirable that at least 1 per cent and preferable that at least 50 per cent of the composition to be polymerized consist of one or more vinyl aromatic silanes of the invention. Thermoplastic compositions are normally produced by such copolymerization unless the material copolymerized with the silanes of the invention is di- or tri-functional (i. e., has two or three polymerizable double bonds).

Although the hydrolysis (or cohydrolysis) products of a vinyl aromatic silane embodying the invention can be obtained by the method of the invention which comprises decomposition by hydrolysis of an organosilicon compound having the general formula hereinbefore defined (or a mixture thereof with other silanes), it may, in some cases, be desirable first to isolate the vinyl aromatic silane of the invention (e. g., after producing it by the method of the invention which comprises pyrolysis) and then to obtain its hydrolysis or cohydrolysis products.

It is possible to conduct the hydrolysis of a vinyl aromatic silane embodying the invention simply by adding the vinyl aromatic silane (alone or as a constituent of a silane mixture) to water or to a hydrolyzing solution of an inorganic acid in water. The hydrolyzing solution can also be a water solution of a base (as hereinbefore described). Usually at least partial condensation (i. e., to a siloxane structure comprising Si—O—Si bonds) accompanies or follows immediately the hydrolysis. However, it has been found possible to conduct the hydrolysis reaction so that complete condensation does not follow immediately the hydrolysis reaction, with the result that liquid, hydrolyzed and only partially condensed silanes can be isolated after the hydrolysis reaction.

Any of the silanes hereinbefore described (that can be used in admixture with the organosilicon starting materials for the method of the invention which comprises decomposition by hydrolysis) can be cohydrolyzed with the vinyl aromatic silanes embodying the invention. It is desirable that at least 1 mol per cent and preferable that at least 50 mol per cent of the silanes to be hydrolyzed consist of one or more vinyl aromatic silanes of the invention.

The procedure for hydrolyzing silanes embodying the invention comprises adding slowly with stirring the silane (or mixture of silanes) dissolved in an organic solvent (as hereinbefore described) to water or to a hydrolyzing solution, separating the solvent solution layer from the water layer, and drying the solvent solution, e. g., over sodium sulfate. The solvent may then be removed, e. g., by heating on a steam bath.

The amounts of solvent and hydrolyzing solution used in the hydrolysis of silanes of the invention should be within the limits hereinbefore described for the method of the invention that comprises decomposition by hydrolysis. When the hydrolyzing solution is a dilute water solution of an inorganic acid, the inorganic acid can be any mineral acid, such as hydrochloric, phosphoric, or sulfuric. An extremely dilute solution is usually preferred, e. g., one containing only a few drops of about one normal acid per mol of water. When the hydrolyzing solution is a dilute water solution of a base, it is usually preferable that the concentration of the base in the hydrolyzing solution be the same as indicated for the inorganic acid.

It is ordinarily preferable that the silanes be added to the hydrolyzing solution at such a rate that one mol is added in not less than about 15 minutes, and most desirable that the rate be such that one mol is added in not less than about 25 minutes.

It is also possible (e. g., by adding a polymerization catalyst to a silane of the invention, to a mixture of silanes of the invention, or to a mixture of one or more silanes of the invention and another substance or mixture of substances with which such silanes can be copolymerized, as hereinbefore described) to hydrolyze or cohydrolyze silanes of the invention so that polymerization and hydrolysis occur simultaneously.

The vinyl groups in a hydrolyzed composition embodying the invention can be subjected to addition polymerization in order to produce polymeric compositions derived in part from condensation through Si—O—Si bonds and in part from addition polymerization through the vinyl groups. It is usually desirable that such polymerization be conducted in the presence of one of the polymerization catalysts hereinbefore described. The amount of a polymerization catalyst that is used is based upon the weight of the vinyl-aromatic silanes hydrolyzed or cohydrolyzed. It is employed in the usual catalytic amounts, as hereinbefore described.

The temperature at which the polymerization of these vinyl groups is conducted depends upon the molecular structure of the siloxanes of which the vinyl groups form a part. The vinyl groups undergo reasonably rapid addition polymerization at temperatures as low as about 50° C., although it is usually desirable to conduct the polymerization at temperatures not lower than about 60° C. If the siloxanes to which the vinyl groups are attached have been condensed completely prior to polymerization of the vinyl groups this polymerization is the only reaction that occurs, and, ordinarily, it is not advantageous to conduct such polymerization at temperatures higher than about 90° C. It is usually preferable to conduct such polymerization at temperatures not higher than about 80° C. However, such units may be present in siloxanes that are only partially condensed. When this is true it is usually desirable that both addition polymerization through the vinyl groups and further condensation to Si—O—Si bonds be conducted simultaneously. Although the vinyl groups of such a composition can be polymerized at temperatures within the ranges set forth above, complete condensation of the siloxane type (i. e., through formation of Si—O—Si bonds) does not occur at such temperatures within a reasonable period of time. When it is desired simultaneously to accomplish the addition polymerization and the condensation, the material should ordinarily be subjected to a temperature of at least about 140° C., and it is usually preferable that the material be subjected to a temperature of at least about 160° C. Usually it is not desirable to subject the material to a temperature higher than about 200° C., and it is ordinarily preferable not to subject the material to a temperature higher than about 180° C. It is possible to polymerize the partially condensed siloxane compositions of the invention at temperatures within the lower range hereinbefore set forth, and then to subject the resulting material to a higher temperature (i. e., one within the higher range) in order to complete the condensation. In some instances such a procedure may be preferred to produce a resin for a special purpose.

The following examples illustrate the practice of the invention:

*Example 1*

A compound embodying the invention is prepared by the method of the invention according to the following procedure:

A haloalkylsilane (2.27 mols of beta-chloroethyltrichlorosilane) is mixed with an aromatic compound (1.36 mols of benzene) in a 1 liter three-necked flask equipped with a mercury sealed stirrer and a reflux condenser fitted with a calcium chloride tube. The mixture is stirred and gently heated while an aluminum halide (2 mol per cent of aluminum chloride based on the amount of haloalkylsilane) is added in small portions over a period of one hour. After the addition of aluminum chloride is completed, the mixture is refluxed for one hour. The mixture is then cooled to about 95 degrees C. and phosphorus oxychloride (5 cc.) is added to complex the aluminum chloride. After further cooling, a hydrocarbon solvent, (500 cc. of "Sohio S. R. Solvent," a petroleum fraction composed mainly of aliphatic hydrocarbon material, boiling within the range 100 to 286 degrees F.) is added to precipitate the AlCl₃.POCl₃ complex. The mixture is allowed to stand overnight and is then filtered. The filtrate is placed in a 1 liter Claisen flask and the excess hydrocarbon solvent is distilled at atmospheric pressure. The residue is then distilled at reduced pressure to recover all the material boiling at temperatures up to 220 degrees C. at 1 mm. Hg (absolute pressure). This material is distilled to yield a fraction (134 grams), B. P. 154–174 degrees C. at 1 mm. Hg. This fraction is redistilled to yield a bis(2-trichlorosilylethyl)benzene, B. P. 155–165 degrees C. at 1 mm. Hg.

A polyl(silylalkyl) aromatic compound (207 grams of a bis(2-trichlorosilylethyl)benzene prepared by two runs according to the procedure described in the preceding paragraph) is charged into a glass chlorination tube approximately three feet in length, having an internal diameter of about 50 mm. The tube is packed at the bottom with Raschig rings (to a height of about 5 cm.) and fitted with a gas inlet tube (having an internal diameter of about 6 mm.) which is sealed through the bottom of the chlorination (reactor) tube so that the chlorine is discharged vertically (near the bottom of the reactor) into the organosilicon compound. The top of the reactor tube is fitted with a Dry-Ice condenser and a glass tube which conducts any gases not condensed in the Dry-Ice condenser to a water scrubber where the HCl formed by the chlorination is removed. The chlorination tube is illuminated with ultraviolet light from a "Mazda CH-4" 100 watt ultraviolet lamp. As chlorine gas is introduced into the chlorination tube, the evolved HCl is passed from the top of the Dry-Ice condenser to the scrubber. The scrub water is passed into a flask containing an equivalent amount of potassium hydroxide (28.95 grams) and methyl orange as an indicator. The chlorine is passed through the tube until the methyl orange indicator shows that the potassium hydroxide is neutralized.

The liquid in the reactor tube (222 grams) comprises a mixture of unchlorinated and chlorinated bis(2-trichlorosilylethyl)-benzenes, the latter believed to be a mixture comprising mainly a beta-(2-trichlorosilylethylphenyl)-beta-chloroethyltrichlorosilane, with small quantities of a bis(beta-trichlorosilyl-alpha-chloroethyl)-benzene, a bis(beta-trichlorosilyl-beta-chloroethyl)-benzene, a beta-(2-trichlorosilylethylphenyl)-alpha-chloroethyltrichlorosilane and a beta-(2-trichlorosilyl-beta-chloroethylphenyl)-beta-chloroethyl-trichlorosilane.

The chlorinated mixture obtained according to the procedure described in the preceding paragraph is charged into a dropping funnel which is fitted to a 125 ml. Claisen flask equipped with a thermometer. The flask is connected to a condenser which leads to a receiver and from there to a Dry Ice trap. The system is flushed with nitrogen for about five minutes. The chlorinated material is added dropwise to the flask over a period of 45 minutes. The flask is heated directly with a Bunsen burner, the heat being adjusted so that the liquid vaporizes immediately upon contact with the glass surface. The vapor temperature of the distilling liquid varies between 250 and 270 degrees C. The liquids in the receiver and Dry Ice trap (195 grams of the combined liquids) are placed in a 350 ml. Claisen flask and distilled. Silicon tetrachloride (58 grams) is distilled partially at atmospheric pressure and partially under reduced pressure, and the distillate is collected in a Dry Ice trap. The residue is then distilled under reduced pressure. A fraction (22 grams) consisting mainly of a divinyl benzene is collected before obtaining a second fraction (100 grams), B. P. 150–210 degrees C. at 3 mm. Hg. This latter fraction is redistilled to give a 2-(vinylphenyl)ethyltrichlorosilane, B. P. 164–175 degrees C. at 3 mm. Hg. The residue from this redistillation contains mixtures of other vinyl aromatic compounds, probably including a 2-[(2-trichlorosilylvinyl)phenyl]ethyltrichlorosilane, a 2-(vinylphenyl)vinyltrichlorosilane, and 1,4-bis(2-trichlorosilylvinyl)benzene.

The following compounds may also be chlorinated and pyrolyzed as described in the preceding paragraphs to produce other vinyl aromatic compounds: bis(trichlorosilylethyl)chlorobenzenes, bis(trichlorosilylethyl)dichlorobenzenes, bis(trichlorosilylisopropyl)dichlorobenzenes, and bis(trichlorosilylisopropyl)benzenes.

*Example 2*

A compound of the invention is polymerized according to the following procedure:

A sample of a 2-(vinylphenyl)ethyltrichlorosilane (prepared as described in Example 1) is heated in a stoppered test tube for 24 hours at a temperature of 75 degrees C. The polymerized product is a rather soft gel. The use of larger quantities in the foregoing procedure for preparing a 2-(vinylphenyl)ethyltrichlorosilane results in a purer product which polymerizes to a harder polymer.

*Example 3*

A composition comprising a compound embodying the invention is hydrolyzed and polymerized according to the following procedure:

Diethyl ether (100 ml.) is mixed with a 2-(vinylphenyl)-ethyltrichlorosilane (13.3 grams), ethyltrichlorosilane (3.4 grams), and diethyldichlorosilane (4.7 grams). The mixture is poured with stirring into crushed ice (125 ml.) over a period of ten minutes. After the addition of the mixture to the crushed ice is completed the stirring is continued for ten minutes. The few particles of gel which appear at the water-ether interface are probably due to the presence of a small amount of a partially polymerized 2-(vinylphenyl)-ethylsiloxane. The mixture is placed in a separatory funnel and the ether layer which is separated from the water layer is washed with water (two 25 ml. portions). The washed ether solution is then dried over sodium sulfate (10 grams) for one-half hour. The dried ether solution is filtered from the sodium sulfate and the ether is evaporated from the filtrate on a steam bath. The residue from the ether evaporation is a viscous resin which is heated for ten minutes on the steam bath at a temperature of approximately 85 degrees C. to give a polymer which is a soft gel.

The procedure described in the preceding paragraph is repeated, using an equivalent amount of ethyltrichlorosilane instead of the vinyl aromatic silane. This resin does not polymerize even after a much longer heating period at 85 degrees C.

We claim:

1. A method of producing vinyl aromatic compounds that comprises generating a vinyl aromatic compound by decomposition to remove the radicals Y and X₃Si from an organosilicon compound having the general formula

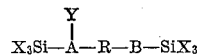

wherein A is a saturated trivalent hydrocarbon radical having from two to three carbon atoms one of which is connected to R and the remainder of which are connected to the carbon atom that is connected to R, the silicon atom and Y being connected to adjacent carbon atoms; B is a saturated divalent radical which has from two to three carbon atoms, and in which any atom other than carbon and hydrogen consists of a halogen having an atomic weight between 35 and 80; R is a divalent aromatic radical whose atoms consist of hydrogen, from six to eighteen nuclear carbon atoms, and not more than three halogen atoms each having an atomic weight less than 80; X is a halogen having an atomic weight less than 80; and Y is a halogen having an atomic weight between 35 and 80.

2. A method as claimed in claim 1 in which R and Y are connected to the same carbon atom of A.

3. A method as claimed in claim 2 in which R has six carbon atoms.

4. A method as claimed in claim 3 in which each of the radicals A and B has two carbon atoms.

5. A method as claimed in claim 4 in which each of the radicals X and Y is chloro.

6. A method as claimed in claim 5 in which R is phenylene.

7. An organosilicon compound having the general formula

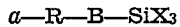

wherein $a$ is an alkenyl radical, having from two to three carbon atoms, in which the carbon atom that is connected to the free valence is connected to each of the other carbon atoms; B is a saturated divalent radical which has from two to three carbon atoms, and in which any atom other than carbon and hydrogen consists of a halogen having an atomic weight between 35 and 80; R is a divalent aromatic radical whose atoms consist of hydrogen, from six to eighteen nuclear carbon atoms, and not more than three halogen atoms each having an atomic weight less than 80; and X is a halogen having an atomic weight between 35 and 80.

8. An organosilicon compound as claimed in claim 7 in which R has six carbon atoms.

9. An organosilicon compound as claimed in claim 8 in which each of the radicals $a$ and B has two carbon atoms.

10. An organosilicon compound as claimed in claim 9 in which X is chloro.

11. An organosilicon compound as claimed in claim 10 in which R is phenylene.

12. A vinylphenylethyltrichlorosilane.

13. A beta-(vinylphenyl)ethyltrichlorosilane.

14. A product of the polymerization of a composition comprising an organosilicon compound claimed in claim 7.

15. A product of the polymerization of a composition comprising an organosilicon compound as claimed in claim 7 in which R has six carbon atoms.

16. A product of the polymerization of a composition comprising a vinylphenylethyltrichlorosilane.

17. A product of the hydrolysis of a composition comprising an organosilicon compound claimed in claim 7.

18. A product of the hydrolysis of a composition comprising a vinylphenylethyltrichlorosilane.

19. A product of the hydrolysis and polymerization of a composition comprising an organosilicon compound claimed in claim 7.

DAVID B. HATCHER.
RAYMOND H. BUNNELL.

No references cited.